US011120026B1

United States Patent
Mostak

(10) Patent No.: US 11,120,026 B1
(45) Date of Patent: *Sep. 14, 2021

(54) SYSTEM AND METHOD FOR EXECUTING QUERIES ON MULTI-GRAPHICS PROCESSING UNIT SYSTEMS

(71) Applicant: OmniSci, Inc., San Francisco, CA (US)

(72) Inventor: Todd L. Mostak, San Francisco, CA (US)

(73) Assignee: Omnisci, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,911

(22) Filed: Feb. 10, 2020

Related U.S. Application Data

(63) Continuation of application No. 16/397,881, filed on Apr. 29, 2019, now Pat. No. 10,558,672, which is a continuation of application No. 15/657,007, filed on Jul. 21, 2017, now Pat. No. 10,275,493, and a continuation-in-part of application No. 15/409,470, filed on Jan. 18, 2017, now Pat. No. 10,157,442.

(60) Provisional application No. 62/365,366, filed on Jul. 21, 2016, provisional application No. 62/280,098, filed on Jan. 18, 2016.

(51) Int. Cl.

| | |
|---|---|
| *G06T 1/20* | (2006.01) |
| *G09G 5/36* | (2006.01) |
| *G06F 16/245* | (2019.01) |
| *G06F 3/14* | (2006.01) |
| *G06F 16/248* | (2019.01) |

(52) U.S. Cl.
CPC .......... *G06F 16/24569* (2019.01); *G06F 3/14* (2013.01); *G06F 16/248* (2019.01); *G06T 1/20* (2013.01); *G09G 5/363* (2013.01); *G09G 2360/06* (2013.01); *G09G 2360/08* (2013.01)

(58) Field of Classification Search
CPC . G06T 1/20; G06F 3/14; G06F 16/248; G06F 16/24569; G09G 5/363; G09G 2360/06; G09G 2360/08
USPC ......................................... 345/501, 502, 505
See application file for complete search history.

(56) References Cited

U.S. PATENT DOCUMENTS

| | | | |
|---|---|---|---|
| 7,561,163 B1* | 7/2009 | Johnson | ............ G06F 15/17337 345/502 |
| 2009/0135180 A1* | 5/2009 | Li | ............................. G06T 1/20 345/420 |
| 2011/0057937 A1* | 3/2011 | Wu | ..................... G06F 15/8023 345/505 |

(Continued)

*Primary Examiner* — Jacinta M Crawford
(74) *Attorney, Agent, or Firm* — Innovation Partners; Charles E. Gotlieb

(57) ABSTRACT

A system and method allocates partitions to be used to perform a query to multiple GPUs and each partition is also allocated to a CPU to which the GPU is attached. The GPUs use any assigned data in GPU memory, and otherwise request it from a CPU, which provides it from CPU memory if possible, and otherwise copies it from long term storage, CPU memory and makes it available to GPU memory. The GPUs process the query against the partitions assigned, optionally by performing portions of the query at a time, for example performing an innermost nested query and then performing the next outermost nested query. The results from any given portion of a query may be accumulated across all GPUs and some or all of the results distributed to each of the GPUs. The remaining work may be balanced by redistributing only some of the accumulated results.

24 Claims, 7 Drawing Sheets

(56) References Cited

U.S. PATENT DOCUMENTS

2012/0047126 A1\* 2/2012 Branscome ....... G06F 16/24569
  707/714
2015/0062154 A1\* 3/2015 Ellis ..................... G06T 15/005
  345/619

\* cited by examiner

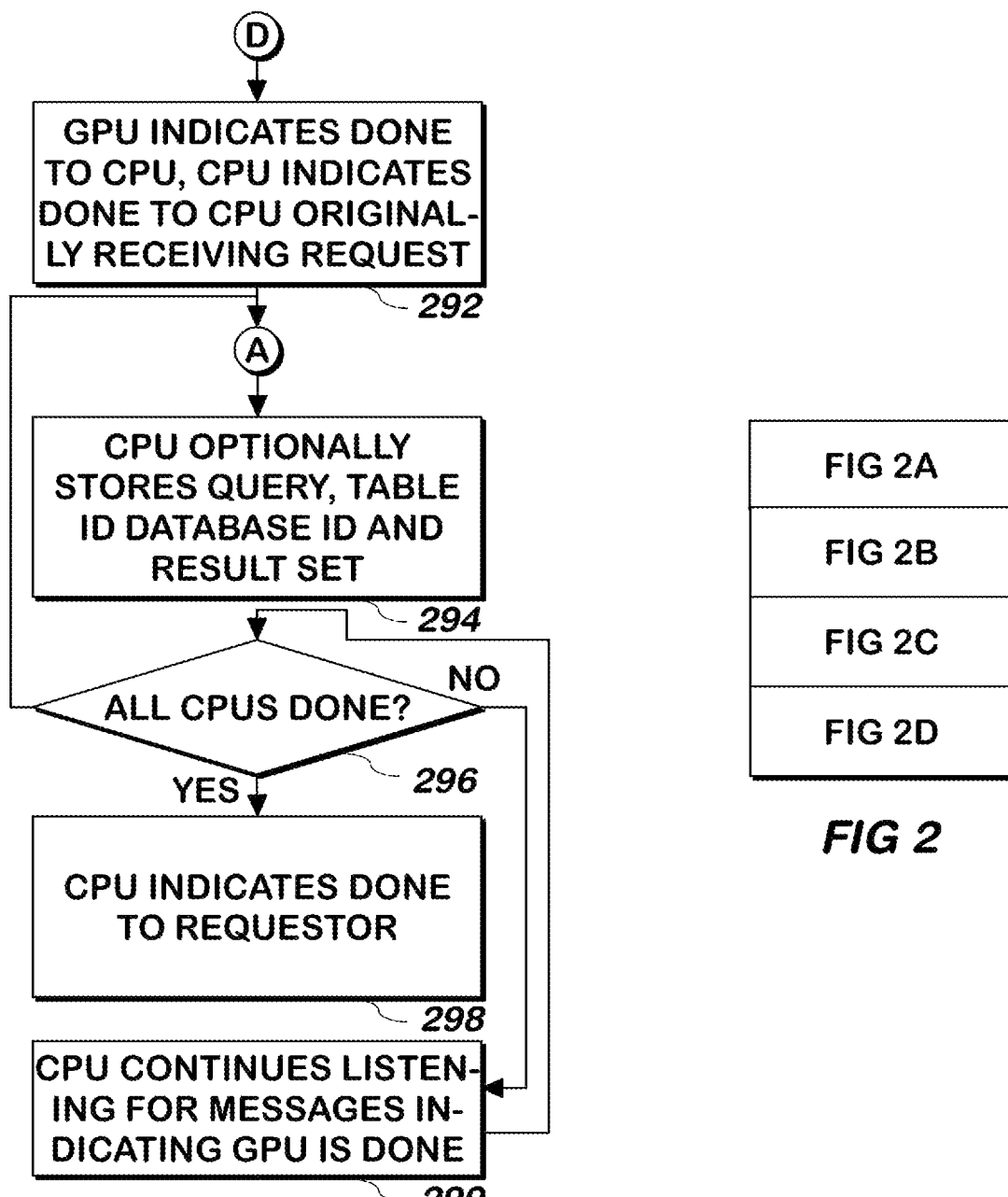

SYSTEM AND METHOD FOR EXECUTING QUERIES ON MULTI-GRAPHICS PROCESSING UNIT SYSTEMS

RELATED APPLICATIONS

This application is a continuation of U.S. patent application Ser. No. 16/397,881 Entitled, System and Method for Executing Queries on Multi-Graphics Processing Unit Systems" filed by Todd Mostak on Apr. 29, 2019, which is a continuation of U.S. patent application Ser. No. 15/657,007 entitled, "System and Method for Executing Queries on Multi-Graphics Processing Unit Systems" filed by Todd Mostak on Jul. 21, 2017, which claims the benefit of U.S. Provisional Patent Application Ser. No. 62/365,366, entitled, "Method and Apparatus for Executing Queries on Multi-Graphics Processing Unit Systems" filed on Jul. 21, 2016 by Todd Mostak and Ser. No. 15/657,007 is a continuation in part of U.S. patent application Ser. No. 15/409,470 entitled, "System and Method for Performing Queries and Displaying Visual Representations of Their Results Using Graphics Processing Units" filed on Jan. 18, 2017 by Todd Mostak and Christopher Root, which claims the benefit of U.S. Provisional Patent Application Ser. No. 62/280,098 entitled, "Method and Apparatus for Performing Queries and Displaying Visual Representations of Their Results Using Graphics Processing Units" filed on Jan. 18, 2016 by Todd Mostak, each having the same assignee as the present invention and each is incorporated by reference in its entirety.

FIELD OF THE INVENTION

The present invention is related to computer software and hardware and more specifically to computer hardware and software for executing queries on a multi-graphics processing unit system.

BACKGROUND OF THE INVENTION

It can be desirable to run queries on systems with multiple graphics processing units (GPUs). What is needed is a system and method for running queries on systems with multiple graphics processing units.

SUMMARY OF INVENTION

A system and method identifies the number and topology of CPUs and GPUs in a system and uses such numbers to allocate partitions relevant to the filtering, joining or aggregating criteria for a query to each of the GPUs and to each of the CPUs (as used herein, A "or" B includes A, B or A and B). Partitions may be those stored or partitions may be generated in response to a result set from a prior, same or potentially different, query that is the same as, or a superset of, the query, but smaller than all of the tables that would otherwise be used.

The GPUs request partitions allocated to them that they don't already have stored in their memories, and the requests are made to the CPUs to which the partitions were also allocated. The CPUs obtain from long term storage partitions they don't have in their CPU memories, and fulfill the requests. If insufficient storage exists for partitions, the CPUs and GPUs release storage for least recently used partitions. Prior to such release, the CPUs first release storage for the least recently used result sets. Result sets may also be stored in parts on GPU storage, in which case the GPUs release storage for least recently used result set parts before releasing storage for least recently used partitions.

The GPUs run the query and output to the CPUs the result sets for each set of partitions allocated to it, one partition from each column relevant to the filtering, joining or aggregating criteria in each set, each partition in the set corresponding to the same set of rows of a table. The CPU to which the result set is output is the CPU to which the partitions used to generate the result set were allocated.

For a non-nested query without aggregation, the GPUs can process the query one portion at a time and then output the partial results to the GPU when the partition has been processed. For queries that have nested components, the nested components are run as part of several passes, with each nested component being run in a pass, starting with the innermost nested components of the query. Aggregation functions may also be run by the GPUs as a nested component. However, aggregation functions may also involve consolidation by one GPU the data from multiple GPUs and redistribution of some or all of the consolidated results to all of the GPUs, which may perform further aggregation or other processing before the results are either provided for output or used in a subsequent pass. The aggregating GPU may assign each GPU a portion of the consolidated partial results, and that portion is returned to the GPU to which it was assigned and that GPU continues processing the portion. The portion may be optionally further consolidated, and used in a subsequent portion of the query by the GPU to which it is assigned. Small result sets may be aggregated by the CPU (instead of the GPU) prior to outputting. All such actions are performed based at least in part on the content of the original query and/or the size of the result set.

The CPUs join other data requested in the query that is not part of the filtering, joining or aggregating criteria of the query, and this process is repeated for each set of partitions assigned to each GPU. The GPUs may indicate that they are done generating results after the last partition set allocated, and, after all such GPUs have provided such indications, a CPU that received the original request or another CPU sends an indication to the requestor that the results are complete. The CPU or GPUs may store the results as one or more result sets to be used for a future query as described above.

DETAILED DESCRIPTION OF A PREFERRED EMBODIMENT

Figure 1:
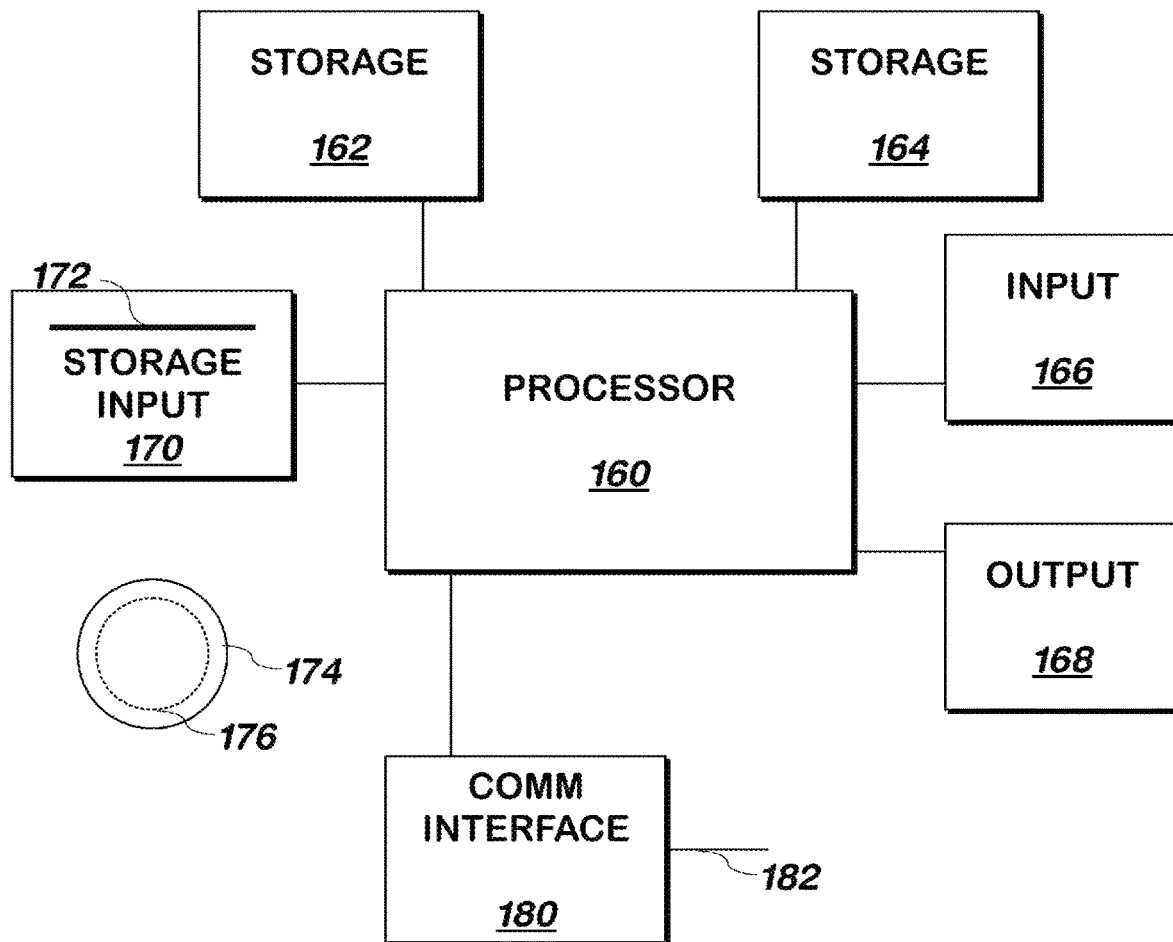
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage systems and may include a conventional database. All elements of a system include any or all of at least one input, at least one output and at least one input/output. Other system elements may include a conventional processor system.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, 7 or 8) commercially available from MICROSOFT Corporation of Redmond Wash. or a Macintosh computer system running the OS X operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
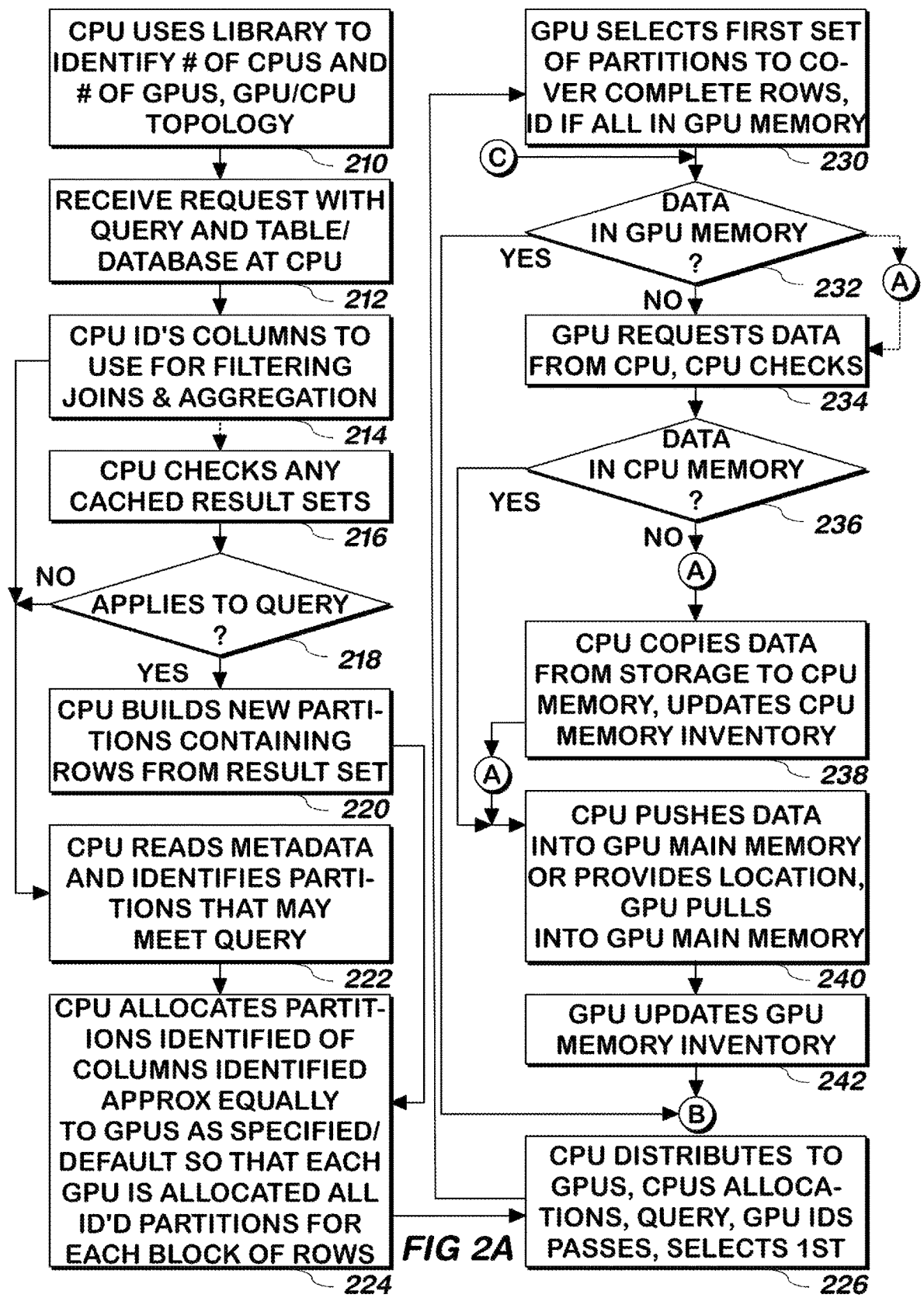
FIG. 2, consisting of FIG. 2A, FIG. 2B, FIG. 2C and FIG. 2D, is a flowchart illustrating a method of executing queries on a multi-graphics processing unit system according to one embodiment of the present invention.
Figure 2B:
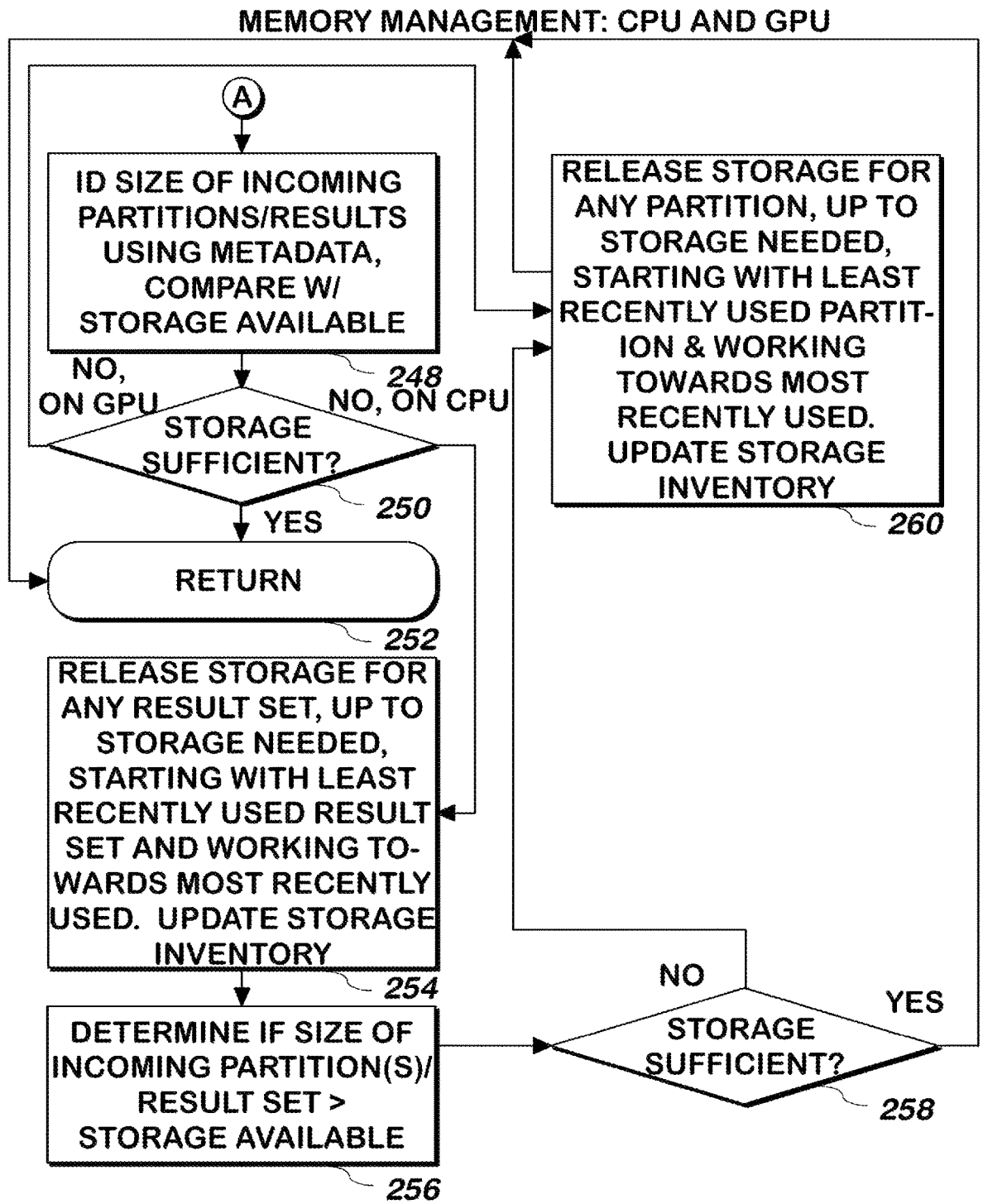
Figure 2C:
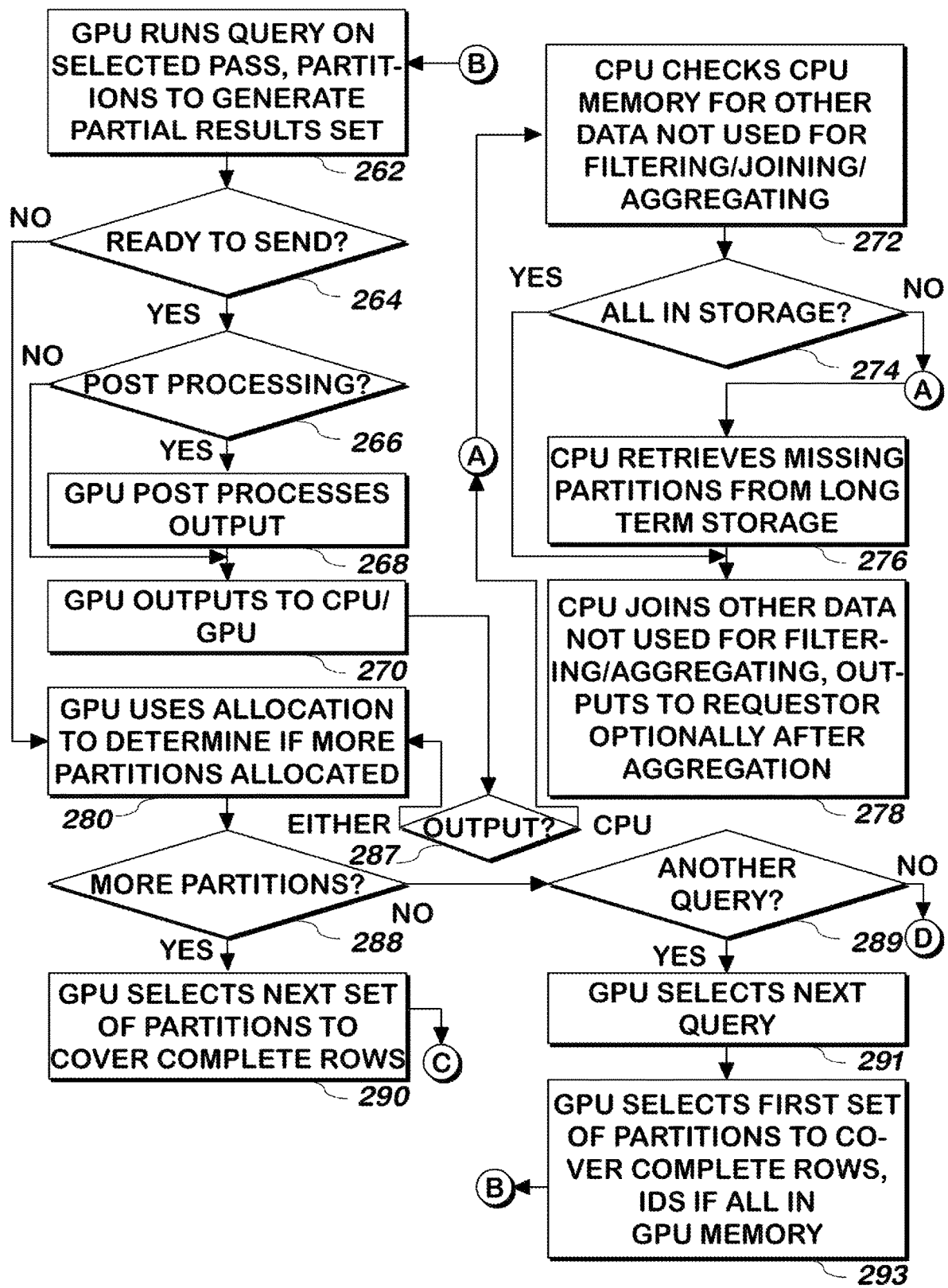

FIG. 2, consisting of FIGS. 2A, 2B, 2C and 2D, is a flowchart illustrating a method of executing a query on a system with multiple graphics processing units (GPUs) according to one embodiment of the present invention. Referring now to FIG. 2, a CPU uses a conventional library to identify the number of CPUs and GPU's in the computer system, and the topology of the GPU's with respect to the CPUs, namely which CPUs are connected to which GPU's 210. As used herein, a GPU is a graphics processing card, which may have multiple cores. There may be one or more GPUs coupled to a CPU, all in the same computer system.

In one embodiment, the CPU uses the hwloc_get_type_depth with the HWLOC_OBJ_SOCKET parameter to get the CPU socket layer in the machine topology, and then uses hwloc_get_nbobjs_by_depth with that layer parameter (an integer) to get an integer back with the number of CPUs.

For each CPU the CPU determines the associated GPUs by using the hwloc_get_obj_by_depth command to iterate over each CPU, then traverses the object→children tree using this command until it arrives at the child GPUs of each CPU node by looking at the name of the children and matching the text of the name with known children names or components of known children names. The CPU then uses libraries such as libcuda for Nvidia GPUs (or the equivalent library for AMD GPUs) to get specific attributes of each GPU (such as amount of memory and number of cores) using commands such as cuDeviceGet and cuDeviceGetAttribute.

A request is received by one of the CPUs specifying a query, and a table or tables within a database on which the query is to be performed 212. The query may be received in the conventional SQL query language, or any other form of a set of criteria by which database information is to be retrieved. The CPU uses the query received, and metadata corresponding to the table or tables in the database to identify the columns in the database that are used for filtering, joins or aggregation 214. Each such column may be specified as part of a where clause, group by clause, or other similar filtering, joining or aggregation clause in the query that identifies the columns on which filtering, joining or aggregation is to be performed. The method continues at step 216 in one embodiment, or step 222 in another embodiment.

At step 216, the CPU compares the query to the query corresponding to each of any result sets it has cached in CPU memory to determine if the query received corresponds to any such cached query. A query corresponds to such a cached query if the query is a subset of, or all of, the cached query. For example, a query that filters on X>7 corresponds to a cached query that filtered on X>7 or X>5. To correspond, the received query will filter using all of the columns of the cached query, though it may filter using additional columns, which are ignored for the purpose of determining the correspondence, and each column or combination of columns in the received query individually will specify a subset of, or all of the specification of the column in the cached query. Correspondence is attempted starting with the most recently used cached query, so that if multiple cached queries correspond, the one most recently used is selected.

If any cached query corresponds to the received query 218, the CPU builds new partitions containing only or primarily the rows from the result set, and the partitions processed as described below are these partitions 220, and the method continues at step 224. In another embodiment, the GPUs may perform this function instead of the CPUs using the portions of the result sets they previously generated and the partitions they store or receive. The CPU may instruct them to perform such function.

At step 222, the CPU reads the metadata from the database that corresponds to the specified table or tables and the columns identified in step 214 to identify partitions that may meet the query. For example, if the query specifies that the value of column must exceed five, and the metadata for the first partition of a column indicates that the maximum value of the rows in column that are contained in the partition is four, the CPU would identify the first partition in all columns as not being able to meet the query. If such maximum value had been six, the CPU would identify that partition as potentially meeting the query. In one embodiment, each partition contains a subset of the rows of the table, or all of the rows of the table, for a single column, with the metadata describing information about the contents of the partition, such as the minimum and maximum value, and optionally other information about the values of the column in the partition. If the query criteria for filtering uses multiple columns, if a partition for one column for a set of rows is determined by the CPU not meet the query, the other partitions for the other columns for the same set of rows are considered to not meet the query as well if the filter so specifies (e.g. the partition for the column that did not meet the query is separated by an "AND" statement in the filter. The method continues at step 224.

At step 224, the CPU allocates the partitions it identified in step 222 or 220 as potentially meeting the query, approximately equally across all of the GPUs, using the number of partitions it identified and the number of GPUs it or another CPU identified. The partitions are allocated so that partitions of any different columns corresponding to the same block of rows in the same table are allocated to the same GPU. Additionally, as part of step 224, the CPU allocates the same partitions assigned to each GPU to the CPU to which the respective GPUs are electrically connected, using the topology information it or another CPU identified as described above.

In one embodiment, the allocation to GPUs may be performed via a round robin approach for each block of rows corresponding to one partition. In another embodiment, a column is identified as a marked column as part of the request received in step 212 and the CPU uses the contents of such column to hash the rows in the column and builds a hash table for each row. Rows with the same hash result are assigned to the same GPU and different hash results are allocated to GPUs so as to assign an approximately equal number of rows to each GPU. The partitions may be repartitioned by the CPU after sorting the rows by hash result or the hash results may be assigned instead of partitions, essentially treating each hash result as a logical partition.

In one embodiment, geospatial (or quad tree or R-tree) partitioning may be used, assigning rows designated as nearby one another (e.g. towns in a metropolitan area) to the same GPU either by repartitioning or by assigning to the same GPU the hash results of rows considered to be nearby one another via logical partitions as described above. Re-partitions may be stored in the CPU storage of the CPU performing the re-partitioning as well as in long term storage and the table and database identifiers from the query may be adjusted by the CPU performing the repartitioning to reference them instead of those specified as part of the request.

In one embodiment, any of the above techniques may be used as specified by the request, with round robin as the default if no technique is specified. In the event geospatial partitioning is specified with the request, a table or other indication of which values of the column used for the geospatial partitioning are considered nearby one another is received with the request or one of a set of prepopulated tables may be used.

The CPU distributes 226 the allocations to the other CPUs and to the GPUs, along with the query. In one embodiment, the size of each partition from the metadata is distributed with the allocations. Distribution to GPUs may be performed via the CPUs to which the GPU is connected. Each GPU then initiates its own thread of the remainder of step 226 and steps 230-294, though some of the steps of such threads may be performed by a CPU as described below.

As part of step 226, the GPU or CPU identifies whether there is a nested query that can be performed with multiple passes. If not, the entire query can be considered to be processed in a single pass.

An example of a nested query is the following query:
SELECT DATE_TRUNC(MONTH, dep_timestamp) AS m, carrier_name, AVG(arr_delay) AS avg_delay FROM flights WHERE carrier_name IN (SELECT carrier_name FROM flights GROUP BY carrier_name ORDER BY COUNT(*) desc LIMIT 5) GROUP BY m, carrier_name;

From a dataset of flight delays, this would get the average flight delay by month for the top 5 airlines (by number of flights flown) over the entire dataset.

The query is parsed and the nested queries are identified and ordered innermost to outermost. An aggregation function may be considered to be a nested query. There may be multiple queries at any given level of nesting, in which case the query listed first may be ordered first or the order may be identified as a function of the needs of the query itself. The partitions corresponding to each sub query at each nesting level are identified along with an identifier of the nesting level. If the CPU identifies such information, it is distributed with the partition identifiers to the GPUs. For example, the sub query "(SELECT carrier_name FROM flights GROUP BY carrier_name ORDER BY COUNT(*) desc LIMIT 5)" is the query at the first level to be performed. The first nested query is selected. If there is no nesting, the query received is considered to be the first nested query. Group by or other aggregating-type functions may be considered to be another nesting level.

At step 230, the GPU selects a first set of partitions to cover the same set of rows containing one partition for each column identified in step 214 for the selected query, and identifies whether all such partitions are in its GPU memory. If such data is in GPU memory 232 the method continues at step 262 of FIG. 2C and otherwise 232 the GPU requests the missing one or more partitions from the CPU to which the missing partitions were allocated, and such CPU checks to see if such data is in CPU memory 234. If so 236, the method continues at step 240 and otherwise 236 the CPU copies the data from longer term storage such as disk or SSD storage to its CPU memory 238 and updates its inventory of which partitions are located in its CPU memory 238. The method continues at step 240.

At step 240, the CPU either copies the requested partitions to GPU memory into available locations in GPU storage specified by the GPU with the request, or identifies their locations in CPU memory to the GPU and the GPU copies such partitions to GPU memory. The GPU updates its memory inventory of partitions held there as part of step 240. The method continues at step 262 of FIG. 2C.

Memory Management.

Each GPU and each CPU manages its memory by releasing items stored in memory to make room for new items in a similar way, so that any needed space occupied by the least recently used partition is released from use to allow it to be overwritten, first, and then other partitions are released working towards the most recently used partition. In the case of the CPU, storage used for any result sets being cached for use as described herein is released prior to releasing memory for partitions, with the memory holding the less recently used result set being released for reuse before a more recently used result set, as will now be described.

The size of the available storage and of the partition or partitions, or result set or other data incoming or other size of needed storage, is identified 248 either by using the metadata for the partition or a size of a result set provided or requested, such as may be as described herein. In the case of a result set, if the size of the storage to hold it cannot be predicted, a buffer of a given size is allocated and used until full, in which case another buffer is allocated if needed. If the size of the available storage is insufficient to hold the incoming data 250, on the GPU, the method continues at step 260 and on the CPU, the method continues at step 254. If the size of the storage is sufficient 250, processing continues 252 from the step as shown in the Figures.

At step 254, storage for any result set that is occupying storage up to the amount of the size of the incoming data, or all of the result sets stored, whichever is smaller, is released, by selecting for release one result set at a time, beginning with the least recently used result set and continuing towards more recently used result sets and then releasing the selected result sets. A storage inventory of the CPU is updated to reflect the release of storage. In one embodiment, storage for a result set previously stored is released for the entire result set, even if it means releasing more storage than is needed. Partial results sets currently being processed are not considered to be a result set and memory storing them will not be released until processing for the query that produced them is complete.

A determination is made 256 as to whether the size of the incoming partitions or other data is still greater than the available storage, for example, by adding together the size of the storage released in step 254 to the storage that was available at step 248 and comparing it to the size of the incoming data. If the available storage is sufficient 258 to hold the incoming data 258, the method continues at step 252, and otherwise 258, the method continues at step 260.

At step 260, storage for the least recently used partitions that are occupying space required for the data received or to be received, is released 260 to allow storage of the incoming data and the inventory of CPU or GPU memory is updated to indicate that the partitions corresponding to the released storage are no longer in memory. The method continues at step 252.

In one embodiment, the GPUs may store portions of result sets they generate, in the same manner, instead of, or in addition to, the result sets being stored by the CPU. In such embodiment, the GPUs will release GPU memory for such portions of result sets before releasing GPU memory for stored partitions.

Other arrangements may be used, for example, assigning a score to each type of data based on its age and type and releasing storage according to the score, so that very recently used result sets or portions of result sets may be preferred for retention over much less recently used partitions.

Producing, Completing and Providing Partial Results Sets.

At step 262 of FIG. 2C, the GPU performs the selected query against each rows in the selected partitions. The query may be the entire query received or the sub query of a nested query selected. If the partial results set, that results from the selected query on the selected partitions, is ready to send to the CPU or other GPUs (the partial results set will be sent to a CPU, for example, where either there is no nesting, e.g. a query "select a, b, c from foo where bar>7" or the current iteration is the outer set of nesting) except for any post processing needed as described below 264, the method continues at step 266. Partial results sets are sent to GPUs if required for a subsequent query generated from the originally received query, because of nesting as described above.

In one embodiment, the partial results set from aggregation functions are considered to be ready to send to the CPU or other GPUs after all partitions assigned to the GPU are processed by the GPU.

At step 266, if there is any post processing required, the post processing is performed 268 and the method continues at step 270 and otherwise 266, the method continues at step 270.

Post processing may include aggregating and/or sending or merging result sets by sending them to a designated GPU and then having that GPU merging them (for example, summing the corresponding counts). That GPU receives them and when all such partial results sets are received by the designated GPU, it merges all of them. The GPUs may pass indications of the GPUs that processed the partial results sets merged to allow a GPU to identify when all of the partial result sets have been merged.

Merged partial results sets may be redistributed to the GPUs as part of step 270 if such partial results sets are to be used in a subsequent pass of the query. For example, in the query described above, the partial results from the "SELECT carrier_name FROM flights GROUP BY carrier_name ORDER BY COUNT(*) desc LIMIT 5" is used to perform the remainder of the query, and thus, would be redistributed to the GPUs. If this query was the entire query requested, in one embodiment, the results would be accumulated among the GPUs but not redistributed to the GPUs, but provided to the CPU or CPUs as part of step 270.

In one embodiment, when partial results are redistributed, the results are used to generate assignments of such results to individual GPUs. The determination as to whether or not to do this may be made based on whether all of the merged partial results are needed on all of the GPUs. For example, each GPU may be assigned only one carrier_name or a limited number of carrier_names in an example similar to the example above, which doesn't apply to the example above. Such assignment may be made explicitly, or implicitly by only distributing to GPU partial result set data assigned to that GPU. Assignment may be made based on the number of results in order to attempt to balance the remaining query load among the GPUs. One or more hash functions may be performed on some or all of the columns of each of the rows to assign the accumulated results. The rows having a hash result within a set of hash results assigned to a GPU may be distributed by the GPU.

It is noted that a partial results set may be the complete results of a query.

In one embodiment, any aggregation function not needed to perform a remainder of the query result is not aggregated by the GPUs but the partial results that can be used to perform the aggregation are provided by the GPUs or the GPU designated to aggregate the results to the CPUs or provided by such designated GPU to the CPU to which it is directly connected and aggregated by such CPU or CPUs. Such aggregation may be performed by the CPU if the result set is small and not needed for a subsequent pass of step as described herein, which may be ascertained by the designated GPU. Additional processing that may be needed or desirable to use the merged results for a subsequent query pass that were received by a GPU may be performed as part of step 262. If needed per the query, one designated CPU will perform a final aggregation as part of step 298 or step 278.

Partial result sets may only be merged with those generated from partitions assigned to the same CPU, and the assignment information may be used to identify how such merging is to occur and when it is completed. Merged result sets may be distributed to all of the GPUs as part of the post processing step 268, for example, if needed from a nested query.

If the partial results set is not ready to be sent to the CPU or GPU (with the exception of any post processing) 264, the method continues at step 280. For example, in the innermost nested query above, partial result sets would be sent after all of the partitions assigned to a GPU had been processed by the GPU.

At step 270, the GPU outputs a partial results set to the CPU 270 assigned the same partitions as most recently processed. The partial results set is the row index that identifies the order of the row relative to the start of the partition, and the contents of the rows of the selected partitions, that meet the filtering criteria of the query, to the CPU assigned to those partitions, along with a partition index that identifies the ordinal number of each of the partitions used for the query. The GPU may store the results for later reuse in GPU memory. The CPU receives the partial results set in a buffer it maintains for each GPU from which results may be received, or by using CPU memory in the same manner it is used to receive partitions, including releasing memory used to store results sets and partitions as described above with respect to FIG. 2B. If the partial results set is distributed to at least one other GPU, either before or after post processing 287, the method continues at step 280. If the partial results set is distributed to the CPU 287, the method continues at steps 272 and 280. The partial results set is distributed to the CPU is if is not needed to perform another query in a nested set of queries or if there is no nesting.

The receiving CPU checks its memory for partitions corresponding to columns in the query that are specified, but not used to filter, join or aggregate that have the same partition index 272, and if not all such partitions are in CPU memory 274, it obtains them from long term storage, such as disk or SSD 276, releasing any CPU memory needed to store such partitions as described above with respect to FIG. 2B, and the method continues at step 278. If all such partitions are in CPU memory 274, the method continues at step 278.

At step 278, the CPU that received the partial results set joins the data from the other columns that corresponds to each of the rows in the partial results set and outputs it to the CPU that originally received the request (if the CPU is not that CPU) or to a different CPU or does not output it, and such CPU outputs it to the requestor. In one embodiment, partial results sets that are to be aggregated and not used for a subsequent pass of the query may be aggregated on the CPU as part of step 278 if they were not aggregated by a GPU.

At step 280, the GPU uses the allocation it received to determine whether there are additional partitions allocated to it that apply to the currently selected query. If so 288, the GPU selects the next set of partitions for the currently selected query, the next one for each column from among those assigned to it 290, and the method continues at step 232 of FIG. 2A, using the newly-selected partitions, and otherwise 288, the method continues at step 289.

At step 289, if there are no more queries resulting from the originally received query, e.g. because there were no nested queries or because the last nested sub query has been performed, the method continues at step 292 of FIG. 2D and otherwise 289, the GPU marks as completed the most recently performed query, and selects the next query from the nested queries to be performed 291. The GPU selects the first set of partitions from those that apply to the currently selected query to cover a complete row for the selected query and identifies whether all of the selected partitions are in GPU memory 293. The method continues at step 262 using the newly selected query and partitions.

At step 292, the GPU indicates to the CPU to which the partitions it processed are assigned, that it is done processing partitions, that CPU indicates to the CPU that originally received the request (if different) that the GPU is finished, and the method continues at step 292 and optionally at step 294, optionally after performing the steps of FIG. 2B.

At step 294, the partial result sets and the partition indices from the GPU that indicated it was finished are stored in CPU memory for potential reuse as described above, along with the table and database identifiers to which they correspond. At step 296, if the CPU that originally received the request or another CPU has received indications of being done from all of the GPUs to which it assigned partitions (including itself), such CPU indicates to the entity from which the request was received that the results are complete 298 and otherwise, such CPU continues monitoring for indications that the GPUs are done 299 and the method continues at step 296 for the thread of a different GPU.

System.

Figure 3:
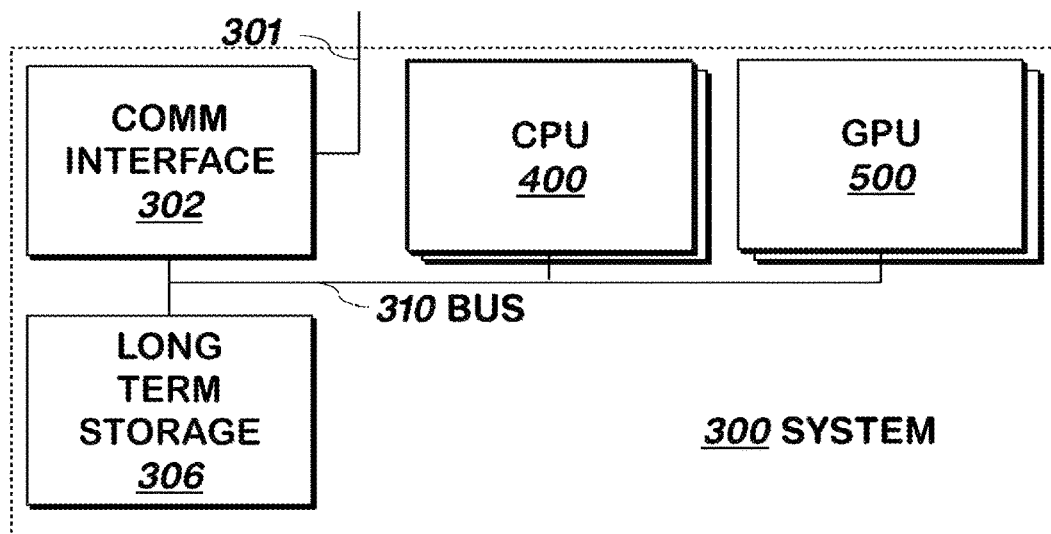
FIG. 3 is a block schematic diagram of a system for executing queries on a multi-graphics processing unit system according to one embodiment of the present invention.

FIG. 3 is a block schematic diagram illustrating a system 300 for executing queries on a multi-graphics processing unit system according to one embodiment of the present invention. System 300 includes a conventional server computer system programmed to operate as described herein, in one embodiment, including communication interface 302, one or more conventional central processing units 400, such as the cores in a conventional core i7 processor commercially available from Intel Corporation, and one or more conventional graphics processing units 500, each of which may include a conventional GEFORCE GTX 1080 other similar graphics processing card commercially available from NVIDIA Corporation of Santa Clara, Calif. Other hardware systems capable of providing similar functionality may be employed as CPUs 400, such as via logic hardware (conventional gate arrays, etc.) optionally controlled with firmware, to operate as described herein.

Communication interface 302 includes a conventional communication interface, such as a TCP/IP-compatible communication interface running suitable communications protocols, such as TCP/IP, Ethernet and other conventional communications protocols. Communication interface 302 includes input/output 301 coupled to a conventional Ethernet network, the networks of the Internet, or both. Unless otherwise described, all communication into or out of system 300 is made via input/output 301 of communication interface 302.

Figure 4:
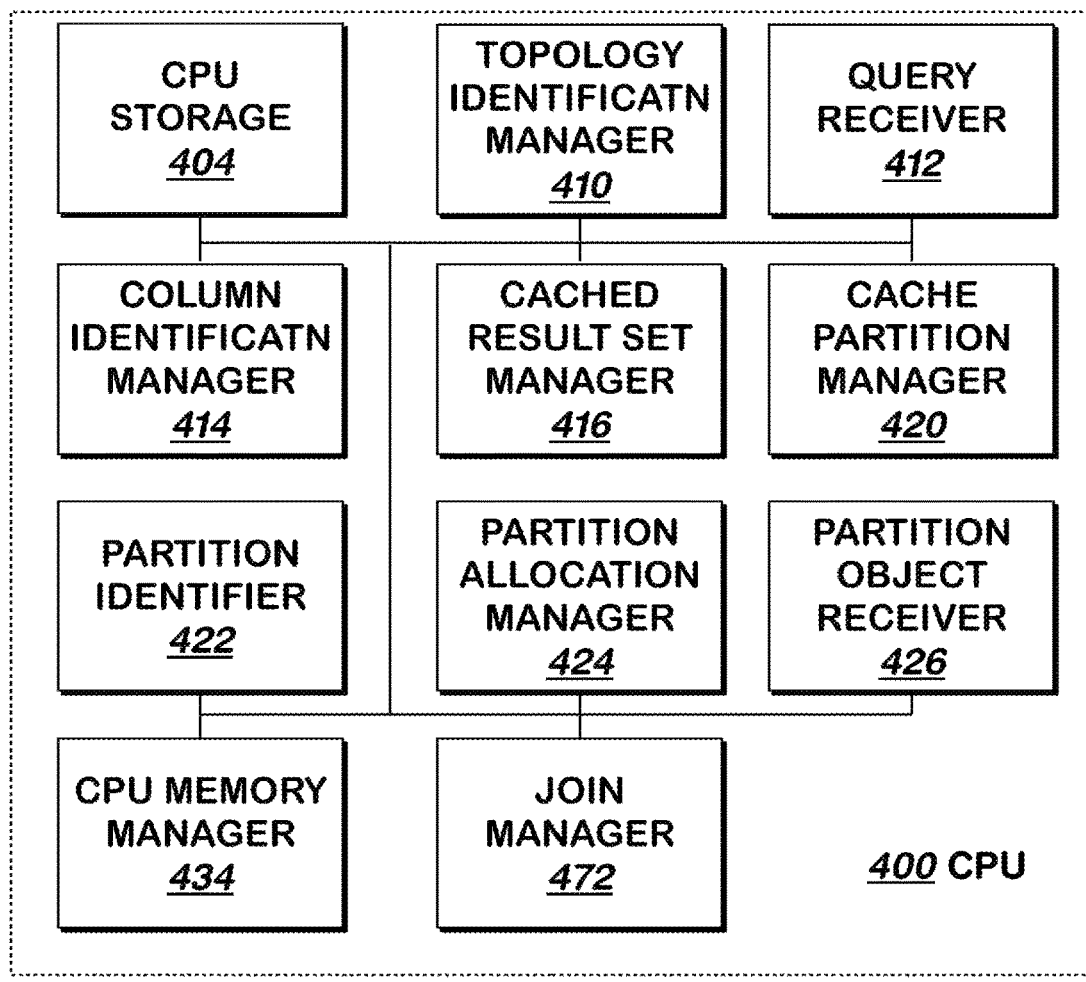
FIG. 4 is a block schematic diagram of a CPU of FIG. 3 according to one embodiment of the present invention.
Figure 5:
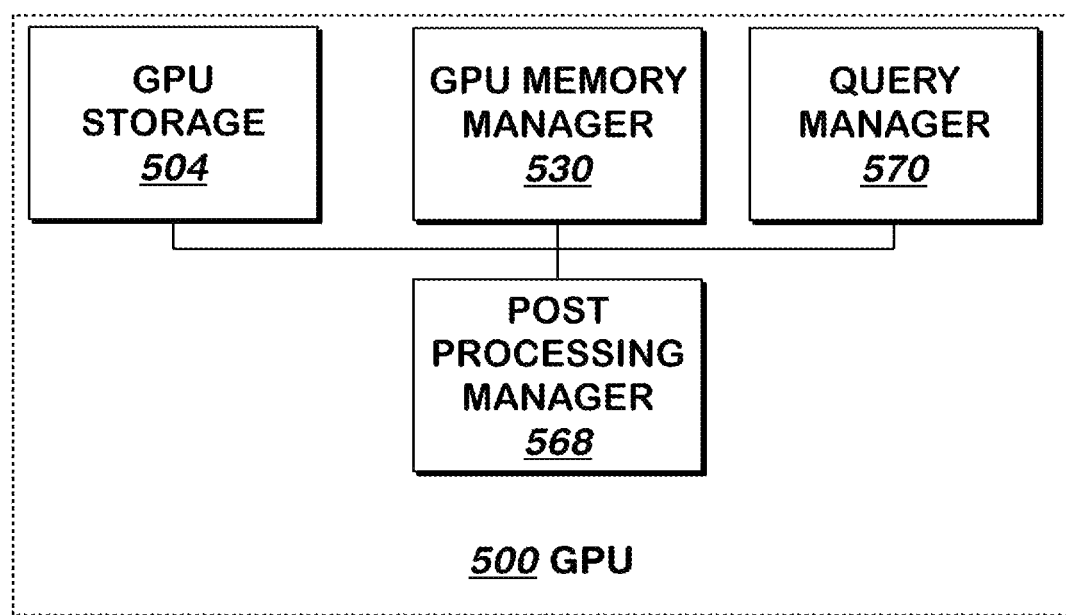
FIG. 5 is a block schematic diagram of a GPU of FIG. 3 according to one embodiment of the present invention.

FIG. 4 illustrates a representative central processing unit 400 in more detail according to one embodiment of the present invention. FIG. 5 illustrates a representative graphics processing unit in more detail according to one embodiment of the present invention.

Referring now to FIGS. 3, 4 and 5, at system startup, topology identification manager 410 identifies the topology of the computer system, as described above, to identify the number of CPUs 400 and GPUs 500 in system 300, and which GPUs 400 are coupled to which CPUs 500. Topology identification manager 410 internally stores such information, to provide it upon request as described below. Topology identification manager 410 may occasionally repeat such process, so, for example, it may detect a GPU 500 that is not operational, allowing the system 300 to respond to changes in configuration or topology.

Query receiver 412 receives a query as described above, including one or more table and database identifiers, parses the query, and builds a query object that includes a unique identifier, the query (including table identifier or identifiers) and database identifier or identifiers, identifier of the entity from which the query was received, and provides the query object to column identification manager 414.

When it receives the query object, column identification manager 414 uses the query to identify the columns used for filtering, joins and aggregation as set forth above, stores identifiers of such columns into the query object as such, and identifies and stores in the query object any other columns referenced in the query as those not so used, and provides the query object to cached result set manager 416. In one embodiment, query receiver 412 and/or column identification manager 414 and some or all of other components described herein as being part of a CPU 400 may reside in a one or more computer systems separate from the computer system containing CPUs 400 and GPUs 500.

When it receives the query object, cached result set manager 416 checks the metadata of any cached result sets stored in CPU storage 404 to determine if any cached result set applies to the query in the query object, as described above, and if any cached result set applies to the query, it provides an identifier of the cached result set in CPU storage 404 to cache partition manager 420, which builds in CPU storage 404 one or more new partitions from the cached result set as described above, stores such one or more partitions into CPU storage 404 (which may include conventional random access memory) and stores into the query object identifiers of the partitions, the identifiers of the column to which each partition corresponds, and the range of row identifiers to which each partition corresponds, and other metadata used to process the query as described herein. The identifiers of the partitions indicate the location of that partition. Cache partition manager 420 provides the query object to partition allocation manager 424, described in more detail below.

If no cached result set applies to the query as described above, cached result set manager 416 provides the query object to partition identifier 422. When it receives the query object, cached result set manager 416 uses the database identifier, table identifiers and the remainder of the query to locate the metadata for partitions of those tables in the database, and identify the partitions corresponding to rows that may meet the query and columns set forth in the query. Cached result set manager 416 adds to the query object identifiers of the partitions it identifies, identifiers of the column, and the range of row identifiers to which each partition corresponds and provides the query object to partition allocation manager 424.

When it receives the partition object, partition allocation manager 424 allocates the partitions in the partition object to GPUs and CPUs using the topology information it retrieves from topology identification manager 410 and indicates which CPUs are assigned to which GPUs in the partition object as described above.

In one embodiment, partition allocation manager 424 parses the query into one or more sub queries based on nesting, aggregation and other factors described above and orders the sub queries so that sub queries whose results are used to perform other sub queries are processed first. The partitions for each sub query are then identified and added to the query object as described above, but they are also associated with the sub query and a unique identifier of the sub query. If metadata is not included as part of, or transferred with, the partitions, it may be included into the query object by partition allocation manager 424 and associated with its respective partition. Partition allocation manager 424 uses the sub queries to identify in the query object, associated with each sub query, whether the results are to be collected and aggregated/accumulated, whether the aggregated accumulated results to be redistributed to the GPUs, whether the aggregated results should be redistributed to the GPUs in their entirety or distinct portions are to be redistributed to each GPU, and whether the results are to be distributed to the CPUs. Instructions for redistribution either the CPU connected to the aggregating GPU or to one or more GPUs, including whether and how results should be split among receiving GPUs may also be added to the query object for each sub query by partition allocation manager 424. Such information may indicate that results should be split for redistribution if they exceed a threshold size, and the threshold. All such information is identified as described above, using the query.

Partition allocation manager 424 stores into the partition object such information about the assignments of the partitions, optionally identifies in the query object the CPU in which it resides and the GPU which will aggregate any partial results set, and distributes copies of the partition identifiers and assignments from the partition object to partition object receiver 426 in the CPUs 400 and distributes copies of the partition object to partition object receiver 526 in each GPU 500. Each GPU 500 and CPU 400 to which the partition object was distributed then operates as described below.

When it receives the partition object, partition object receiver 526 provides the partition object to GPU memory manager 530, which selects the first sub query, stores an indication of such selection in the query object, selects the first set of partitions marked as corresponding to columns used for filtering, joining and/or aggregating for the selected sub query and that cover a complete set of rows in the table or tables set forth in the partition object, marks the selected partitions in the query object and checks an inventory in GPU storage 504 (which may include conventional random access memory on a GPU interface card) to identify whether all of the partitions selected are in GPU storage 504. If so, GPU memory manager 530 stores their locations into the query object associated with the respective partition identifier and provides the query object to query manager 570.

Otherwise GPU memory manager 530 provides the partition identifiers of the partitions not in GPU storage 504 to CPU memory manager 434 of the CPU to which the partitions were assigned as set forth in the query object. Such CPU 400 will be connected to the GPU 500 via a bus 310 such as a conventional PCI-E bus, in one embodiment. When it receives the partition identifiers, CPU memory manager 434 determines, using an inventory in CPU storage 404, of partitions in CPU storage 404. For any such partitions that are not in CPU storage 404, it retrieves them from long term storage 306, which may include conventional disk (e.g. conventional hard drive) or solid state drive storage, and stores them into CPU storage 404. For any such partitions that are in CPU storage 404 or are placed there as described above, CPU memory manager 434 either provides them to GPU storage 504 or identifies their location to GPU memory manager 530, which retrieves them from CPU storage 404 and stores them into GPU storage 504 and updates the inventory of partitions stored in GPU memory. GPU memory manager 530 adds the locations of the partitions to the query object and provides the query object to query manager 570.

GPU memory manager 530 and CPU memory manager 434 use the rules described in FIG. 2B to manage the storage of information into GPU storage 504 (if such function is not performed by CPU memory manager 434) and CPU storage 404 respectively, as described above, and all information is stored by the entity that stored it, associated with the date and time or order it was stored, and the type of information (partition or result set), unless the type can be inferred. In one embodiment, the partitions include metadata for such partition, and in another embodiment, the metadata is separate from the partition containing the data, in which case the metadata is stored in CPU storage 404 and GPU storage 504 with the partition by the entity that stored it. Such associated information and/or metadata may be stored in the inventory of information or separately from it When it receives the query object, query manager 570 runs the currently selected sub query in the query object against the partitions marked in the query object in GPU storage 504 and identifies the partial result set using conventional query processing techniques. In one embodiment, the partial result set is a set of table and of row identifiers of the results of the sub query and the data specified by the sub query in those rows. If an aggregation is specified by the selected sub query, the partial results may still include the row identifiers, to be counted as described below, or just the counts where counts are all that is needed. Query manager 570 stores the partial results set into one or more buffers in GPU storage 504 whose reference it adds to the query object and/or adds the partial results set to the query object, and determines whether the results of the sub query are ready to send to the CPU or other GPUs as described above. Such information may have been specified for the sub query in the query object by partition allocation manager 424, in which case query manager 570 uses such information to make such determination, or it may use the query and results itself to make such determination.

Results Ready to Send

If the results are ready to send to the CPU and do not require aggregation, query manager 570 provides the query object to join manager 472 in the CPU identified in the query object.

Not Ready to Send.

After it processes the sub query as described above, if the results are not ready to send, query manager 570 unmarks and marks as processed in the query object the identifiers of the partitions marked as described above and provides the query object to GPU memory manager 530, which selects the next set of partitions not marked as processed that cover a complete set of rows in the table or tables set forth in the partition object for the currently selected sub query, marks the selected partitions in the query object and repeats the process described above using the newly-selected partitions. If all of the partitions for the selected sub query have been processed, if there are more sub queries, GPU memory manager 530 selects the next sub query, stores an indication of such selection in the query object, and selects the first set of partitions marked as corresponding to columns used for filtering, joining and/or aggregating and that cover a complete set of rows in the table or tables set forth in the partition object, marks the selected partitions in the query object and checks the inventory in GPU storage 504 (which may include conventional random access memory on a GPU interface card) to identify whether all of the partitions selected are in GPU storage 504. The process described above and herein is repeated using the newly selected sub query and partition or partitions.

If all of the partitions for all of the sub queries have been processed, GPU memory manager 530 so indicates to join manager 472.

If space in GPU storage is not available for such buffers, query manager 570 requests it from GPU memory manager 530, which clears space for it, in GPU storage as described above with respect to FIG. 2B and provides buffer identifiers to query manager 570.

Sub Query Results Sent to CPU.

When it receives the query object, join manager 472 uses the identifiers of the columns identified in the query object as not being used for filtering, joining or aggregating, identifiers of the partitions in CPU storage 404 and their metadata to identify whether all partitions for such columns corresponding to the result set are stored in CPU storage 404. In one embodiment, all metadata for such tables is retrieved and stored into CPU storage 404 by partition identifier 422 when it operates as described above, and such metadata is used by join manager 472 to make this identification. Identifiers of any partitions not in CPU storage 404 are provided by join manager 472 to CPU memory manager 434, which obtains then from long term storage 306 as described above, stores them into CPU storage 404 (clearing space as described above), updates the inventory of partitions stored in CPU storage 404 and provides the locations in CPU storage of the partitions and their identifiers to join manager 472.

Join manager 472 joins any relevant data not used for filtering, joining and aggregation, by retrieving the relevant data from the joined rows and provides the data into the query object and/or buffers in CPU storage 404, adding new buffers as needed and referencing such buffers in the query object. If insufficient space is available in CPU storage 404, join manager 472 requests it from CPU memory manager 434, which clears space as described above with reference to FIG. 2B and provides buffer identifiers to join manager. Join manager 472 provides the query object to query receiver 412, which outputs to the entity from which the request was received, the data from the partial result set and any joined data. If no data is to be joined by join manager 472, it provides the query object to query receiver 412, which outputs the data from the partial results set as described above.

After it processes the sub query as described above, if the results are ready to send to the CPU, query manager 570 unmarks and marks as processed in the query object the identifiers of the partitions marked as described above and provides the query object to GPU memory manager 530, which selects the next set of partitions not marked as processed that cover a complete set of rows in the table or tables set forth in the partition object for the currently selected sub query, marks the selected partitions in the query object and repeats the process described above using the newly-selected partitions. If all of the partitions for the selected sub query have been processed, if there are more sub queries, GPU memory manager 530 selects the next sub query, stores an indication of such selection in the query object, and selects the first set of partitions marked as corresponding to columns used for filtering, joining and/or aggregating and that cover a complete set of rows in the table or tables set forth in the partition object, marks the selected partitions in the query object and checks the inventory in GPU storage 504 (which may include conventional random access memory on a GPU interface card) to identify whether all of the partitions selected are in GPU storage 504. The process described above and herein is repeated using the newly selected sub query and partition or partitions.

In one embodiment, join manager 472 stores into CPU storage 404 the partial result sets for a given sub query, optionally with the data it joins, and updates the inventory of CPU storage 404 including the query and/or sub query from the query object and other information it received as metadata, as it processes them, and adds to the query object identifiers of the buffers used for such storage.

Merge Performed on CPU.

In one embodiment, when the post processing manager 568 receives the results from all of the post processing managers of the other GPUs 500 and if the results are to be merged and not used for a subsequent sub query, it checks the total size of the partial results set both identified by that GPU and also received from the other GPUs to see if the total size is above a threshold. If the total size is below a threshold, post processing manager 568 does not merge the results, but instead provides them to join manager 472 with the query object that includes an indication that the results should be merged. Join manager 472 merges the results set prior to performing any join as described above and outputs and stores as described above the merged partial result set as described above.

Such partial results sets for a given sub query may be sent in portions or collected and all at once only when all partitions for a sub query have been processed. If sent in portions, the receiving post processing manager 568 may retain them to merge them or have them merged all at once when an indication is received from each sending post processing manager that the partial results for a given sub query are complete for the sending GPU Sub Query Results Sent to GPU or GPUs.

As noted above, the results of the sub query may be sent to other GPUs, combined, and either sent to a CPU or sent to GPUs, optionally after splitting the results, in a post processing function, as described above. Such functions may have been specified in the query object by partition allocation manager 424, or may be identified by query manager 570 using the sub query and/or results of the sub query. If such post processing is to be performed, query manager 570 sends the query object to post processing manager 568, which sends the partial results, a unique identifier of the GPU, and the sub qluery identifier to the query-object-designated other post processing managers 568 in other GPUs 500, optionally using an operating system (not shown). The receiving post processing manager 568 combines the partial results for the same sub query, and when all such partial results sets have been received as indicated by the GPU identifiers and the topology in its query object, optionally splits the combined results prior to redistribution to the GPUs, and distributes the combined, optionally split results, to the post processing managers 568 in the GPUs or join manager 472 in one or more CPUs. To send to other GPUs, the combining post processing manager 568 sends such information and the sub query identifier to the post processing managers 568 of such other GPUs. The receiving post processing manager 568 requests any needed storage space in GPU storage 504 from GPU memory manager 530, which clears space if needed as described above and identifies the newly cleared space to such post processing manager 568 via one or more buffer identifiers.

It is noted that the providing post processing manager 568 may reserve some of the results for itself to process, in which case, it adds one or more buffer identifiers of buffers containing such information to its own query object. All such buffer identifiers may be added to the query object for future referencing by the receiving and providing post processing managers 568.

If results are to be returned to it after processing as described above, post processing manager 568 signals with the query object query manager 570 when such results are received and stored as described above, and otherwise, post processing manager 568 signals query manager 570 with the query object after it has provided such results.

When signaled, query manager 570 unmarks and marks as processed in the query object the identifiers of the partitions marked as described above and provides the query object to GPU memory manager 530, which selects the next set of partitions not marked as processed that cover a complete set of rows in the table or tables set forth in the partition object for the currently selected sub query, marks the selected partitions in the query object and repeats the process described above using the newly-selected partitions. If all of the partitions for the selected sub query have been processed, if there are more sub queries, GPU memory manager 530 selects the next sub query, stores an indication of such selection in the query object, and selects the first set of partitions marked as corresponding to columns used for filtering, joining and/or aggregating and that cover a complete set of rows in the table or tables set forth in the partition object, marks the selected partitions in the query object and checks the inventory in GPU storage 504 (which may include conventional random access memory on a GPU interface card) to identify whether all of the partitions selected are in GPU storage 504. The process described above and herein is repeated using the newly selected sub query and partition or partitions.

The entities that store into or clear space from CPU storage 404 or GPU storage 504 maintain the inventory of each such storage 404, 504.

Assignment of Portions of the Merged Result Sets to Individual GPUs.

If the merged partial results set is not required in its entirety to process any subsequent sub query but is required for a subsequent sub query, for example, because there is no subsequent join against the full merged partial results set, the merged partial results set may be divided among the number of GPUs identified in the query object into an approximately equal number of actual hash results for each GPU, or an approximately equal number of possible hash results for each GPU, via a hash function performed on one or more of the results in the partial results set. The hash results are calculated and added to each row of the results by the originating or receiving post processing manager 568 so that the receiving post processing manager 568 has them. The hash may be performed against one or more columns of each row, such as the first column or the column or columns that may be used as a key for the sub query or all columns used fort that sub query.

The actual or possible hash results are divided into a number of sets, the number of sets being equal to the number of GPUs that will process them, with each set corresponding to one or more hash results, each hash result corresponding to one set. The rows corresponding to a set of hash results assigned to a GPU are returned to the receiving post processing manager 568 to the post processing manager 568 of that GPU (and retaining for itself one set) and the post processing manager 568 at each such GPU optionally individually accumulates the results they receive (and the collecting post processing manager 568 may not accumulate results in this case) and uses them as part of one or more successive queries or provides them to their respective CPUs as indicated by the query in the query object.

No Further Sub Queries.

In one embodiment, as results are returned to the requestor, they are stored associated with the query and optionally the sub query to which the results correspond, to allow the reuse of such results as described above. In one embodiment, some of the elements described as being as part a CPU are on a separate computer system, such as query receiver 416, column identification manager 416 and/or cached result set manager 416 are in a separate computer system, not shown. As results are returned to the requestor, they are returned via query receiver 412. Query receiver performs such storage into such other computer system and cached result set manager 416 can then use such stored information as described above. If a separate computer system is not used, such elements may be located on a designated CPU and all such results are routed to the requestor via that CPU, and stored on such CPU. A limited amount of storage of such information may be available, so that the least recently used such information is overwritten as space is needed. Such information may be stored separately from, and not affected by, the management of information described with reference to FIG. 2B, in one embodiment.

As information is needed, it is passed in the query object or otherwise by the element that generated it, and as information is no longer needed, it may be removed from the query object. After the query is processed, the query object may be discarded or stored. The query object may be passed to elements that need it.

If, when it receives the query object as described above, GPU memory manager 530 determines that there are no unprocessed sub queries to be processed, GPU memory manager 530 signals join manager 472 for the CPU that handles requests for partitions with an identifier of the GPU in which it resides, which it may obtain from an operating system (not shown) or may be provided in the query object distributed to GPU memory manager. When join manager 472 has received such signals from all GPUs assigned to the CPU in which it resides, join manager 472 signals query receiver 412 (optionally, in the CPU corresponding to the query receiver 412 that received the query) with an identifier of the CPU, obtained in a similar fashion as described above. Query receiver 412 retrieves the topology information from topology identification manager 410 to identify the number of CPUs. When all CPUs have so indicated, query receiver 412 indicates to the requestor that the query is fully processed All system claim elements are to be interpreted as structural elements. The only nonce word to be used in a claim term is the word "means" and no other words are to be interpreted as nonce words.

SUMMARY

Described is a method of performing a database query on a computer including two or more graphics processing units, the method including: identifying a topology of a computer system, regarding a number of the graphics processing units in the plurality; receiving a request including a query and an express or implied specification of a data source; parsing the request to identify at least one component of the query; assigning an order to each of the at least one component of the query parsed; computing an allocation of two or more portions of the data source across each of the two or more graphics processing units; at each of the graphics processing units, applying each of the at least one component of the query parsed to the portion of the data set allocated to the respective graphics processing unit, responsive to the order assigned, to produce at least one set of results at each of the graphics processing units; consolidating at least one of the at least set of results of each of the two or more graphics processing units by at least one central processing unit or graphics processing unit of the computer including the two or more graphics processing units to produce a consolidated set of results; and outputting the consolidated set of results.

The method may additionally include identifying columns of the data source used for filtering, joining or aggregating; and may include an optional feature whereby the allocating the two or more the portions of the data source is responsive to the columns identified.

The method may additionally include: storing the consolidated set of results, and metadata identifying a criteria used to obtain the consolidated set of results; receiving an additional request including an additional query and an additional specification of the data source; and comparing the additional query and the additional specification of the data source to the metadata to determine whether the consolidated set of results can be reused for the additional request.

The method may additionally include partitioning the consolidated set of results responsive to the determining.

The method may include an optional feature whereby the identifying the topology of the computer system additionally comprises identifying a number of one or more central processing units in the computer system and graphical processing units electrically coupled to each of the one or more central processing units; and additionally including allocating each of the two or more portions of the data source to a central processing unit electrically coupled to the graphics processing unit in the plurality to which said portion of the data source in the plurality was, or will be, assigned.

The method may include an optional feature whereby each of the two or more portions of the data source comprises a partition of the data source used for long term storage of the data source.

The method may include an optional feature whereby each of the two or more portions of the data source comprises two or more rows of the data source that generate a same hash result.

The method may include an optional feature whereby each of the two or more portions of the data source are apportioned from the data source as specified in the request.

Described is a system for performing a database query on a computer including two or more graphics processing units, the system including: a topology identification manager for identifying via an input/output a topology of a computer system, regarding a number of the graphics processing units in the plurality, the topology identification manager for providing at an output the number of graphics processing units in the plurality; a query receiver having an input coupled for receiving a request including a query and an express or implied specification of a data source, the query receiver for parsing the request to identify at least one component of the query, assigning an order to each of the at least one component of the query parsed, and for optionally providing at an output the specification of the data source and for providing at the query receiver output at least one component of the query, and, optionally, for each of the at least one component of the query, the order of the component assigned; a partition allocation manager having an input optionally coupled to the query receiver output for receiving the specification of the data source, and to the topology identification manager for receiving the number of the graphics processing units in the plurality, the partition allocation manager for computing an allocation of two or more portions of the data source across each of the two or more graphics processing units, and for providing at an output the allocation; a query manager at each of the graphics processing units, having an input coupled to the partition allocation manager output for receiving at least a portion of the allocation, to the query receiver for receiving the at least one component of the query and optionally for receiving the order of the component, and coupled for receiving a subset of the two or more portions of the data source allocated in the allocation to said graphics processing unit, the query manager for applying each of the at least one component of the query to the subset of the two or more portions of the data source, optionally responsive to the order optionally received at the query manager input, to produce and provide at an output at least one set of results; a join manager having an input coupled to the query receiver for receiving at least one of the at least one component of the query and to the query manager output of at least two of the two or more graphics processing units for receiving the at least one set of results, the join manager for consolidating at least one of the at least set of results of each of the at least two of the two or more graphics processing units to produce a consolidated set of results, and for providing at an output the consolidated set of results.

The system may additionally include a column identification manager coupled to the query receiver output for receiving the at least one component of the query, the column identification manager for identifying and providing at an output identifiers of columns of the data source used for filtering, joining or aggregating, responsive to the at least one component of the query received at the column identification manager input; and may include an optional feature whereby the partition allocation manager input is additionally coupled to the column identification manager output for receiving the identifiers of columns of the data source used for filtering, joining or aggregating, and the partition allocation manager allocates the two or more the portions of the data source responsive to the identifiers of columns of the data source used for filtering, joining or aggregating.

The system may include an optional feature whereby the join manager additionally provides at the join manager output metadata identifying a criteria used to obtain the consolidated set of results; and additionally including a cached result set manager having an input coupled to the join manager output for receiving the consolidated set of results, the metadata identifying a criteria used to obtain the consolidated set of results, and an additional request including an additional query and an additional specification of the data source, the cached result set manager for comparing the additional query and the additional specification of the data source to the metadata to determine whether the consolidated set of results can be reused to process the additional request, and for providing at an output an indication of the consolidated set of results, responsive to a determination that the consolidated set of results can be used to process the additional request.

The system may additionally include a partition identifier having an input additionally coupled to the cached result set manager output for receiving the indication of the consolidated set of results, the partition identifier for partitioning via an input/output the consolidated set of results responsive to the indication received at the partition identifier input. The system may include an optional feature whereby:

the topology identification manager is additionally for identifying via the topology identification manager input/output and providing at the topology identification manager output a number of one or more central processing units in the computer system and graphical processing units electrically coupled to each of the one or more central processing units; and the partition allocation manager input is additionally for receiving the number of one or more central processing units in the computer system and graphical processing units electrically coupled to each of the one or more central processing units, and the partition allocation manager is additionally for allocating via the partition allocation manager output each of the two or more portions of the data source to a central processing unit electrically coupled to the graphics processing unit in the plurality to which said portion of the data source in the plurality was, or will be, assigned.

The system may include an optional feature whereby each of the two or more portions of the data source comprises a partition of the data source used for long term storage of the data source.

The system may include an optional feature whereby each of the two or more portions of the data source comprises two or more rows of the data source that generate a same hash result.

The system: may include an optional feature whereby: the query receiver input is additionally for receiving a partition specification that specifies a manner in which the data source should be partitioned; and the query receiver is additionally for providing the partition specification at the query receiver output; may additionally include a partition manager having an input coupled to the query receiver output for receiving the partition specification and the specification of the data source, the partition manager for apportioning the two or more portions of the data source responsive to the partition specification via an input/output; and may include an optional feature whereby each query manager input is coupled to the partition manager output for receiving the subset of the two or more the portions of the data source allocated in the allocation.

Described is a computer program product including a non-transitory computer useable medium having computer readable program code embodied therein for performing a database query on a computer including two or more graphics processing units, the computer program product including computer readable program code devices configured to cause a computer system to: identify a topology of a computer system, regarding a number of the graphics processing units in the plurality; receive a request including a query and an express or implied specification of a data source; parse the request to identify at least one component of the query; assign an order to each of the at least one component of the query parsed; compute an allocation of two or more portions of the data source across each of the two or more graphics processing units; at each of the graphics processing units, apply each of the at least one component of the query parsed to the portion of the data set allocated to the respective graphics processing unit, responsive to the order assigned, to produce at least one set of results at each of the graphics processing units; consolidate at least one of the at least set of results of each of the two or more graphics processing units by at least one central processing unit or graphics processing unit of the computer including the two or more graphics processing units to produce a consolidated set of results; and output the consolidated set of results.

The computer program product: may additionally include computer readable program code devices configured to cause the computer system to identify columns of the data source used for filtering, joining or aggregating; and may include an optional feature whereby the allocating the two or more the portions of the data source is responsive to the columns identified.

The computer program product may additionally include computer readable program code devices configured to cause the computer system to: store the consolidated set of results, and metadata identifying a criteria used to obtain the consolidated set of results; receive an additional request including an additional query and an additional specification of the data source; and compare the additional query and the additional specification of the data source to the metadata to determine whether the consolidated set of results can be reused for the additional request.

The computer program product may additionally include computer readable program code devices configured to cause the computer system to partition the consolidated set of results responsive to the determining.

The computer program product: may include an optional feature whereby the computer readable program code devices configured to cause the computer system to identify the topology of the computer system additionally comprise computer readable program code devices configured to cause the computer system to identify a number of one or more central processing units in the computer system and graphical processing units electrically coupled to each of the one or more central processing units; and may additionally include computer readable program code devices configured to cause the computer system to allocate each of the two or more portions of the data source to a central processing unit electrically coupled to the graphics processing unit in the plurality to which said portion of the data source in the plurality was, or will be, assigned.

The computer program product may include an optional feature whereby each of the two or more portions of the data source comprises a partition of the data source used for long term storage of the data source.

The computer program product may include an optional feature whereby each of the two or more portions of the data source comprises two or more rows of the data source that generate a same hash result.

The computer program product may include an optional feature whereby each of the two or more portions of the data source are apportioned from the data source as specified in the request.

Each system element may include a conventional hardware processor or hardware processor system or processor system or processor that is coupled to a hardware memory or hardware memory system or memory or memory system, each of these being conventional in nature, specially programmed to perform the functions described herein. A hardware computer processor coupled to a computer memory may include one or more actual processors and memory elements. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa.

What is claimed is:

1. A method of performing a database query on a computer system comprising a plurality of graphics processing units, the method comprising:
   receiving a request comprising the database query and an express or implied specification of a data source;
   parsing the request to identify at least one component of the database query;
   computing an allocation of a plurality of portions of the data source across each of the plurality of graphics processing units;
   at each of the plurality of graphics processing units, applying each of the at least one component of the database query parsed to the portion of the data source allocated to the respective graphics processing unit to produce at least one set of results;
   consolidating at least one of the at least one set of results of each of the plurality of graphics processing units by at least one central processing unit or graphics processing unit of the computer system comprising the plurality of graphics processing units to produce a consolidated set of results; and
   outputting the consolidated set of results.

2. The method of claim 1:
   additionally comprising identifying columns of the data source;
   and wherein the computing the allocation of the plurality of the portions of the data source is responsive to the columns identified.

3. The method of claim 1, additionally comprising:
   storing the consolidated set of results, and metadata identifying a criteria used to obtain the consolidated set of results;
   receiving an additional request comprising an additional query and an additional specification of the data source; and
   comparing the additional query and the additional specification of the data source to the metadata to determine whether the consolidated set of results can be reused for the additional request.

4. The method of claim 3, additionally comprising partitioning the consolidated set of results responsive to the determining.

5. The method of claim 1, additionally comprising:
   identifying a topology of the computer system by identifying a number of one or more central processing units in the computer system and the graphics processing units electrically coupled to each of the one or more central processing units; and
   allocating each of the plurality of portions of the data source to a central processing unit electrically coupled to the graphics processing unit in the plurality to which said portion of the data source in the plurality was, or will be, assigned.

6. The method of claim 1 wherein each of the plurality of portions of the data source comprises a partition of the data source used for long term storage of the data source.

7. The method of claim 1 wherein each of the plurality of portions of the data source comprises a plurality of rows of the data source that generate a same hash result.

8. The method of claim 1 wherein each of the plurality of portions of the data source are apportioned from the data source as specified in the request.

9. A system for performing a database query on a computer system comprising a plurality of graphics processing units, the system comprising:
  a query receiver having an input coupled for receiving a request comprising the database query and an express or implied specification of a data source, the query receiver for parsing the request to identify at least one component of the database query and for providing at an output the specification of the data source and for providing at the query receiver output the at least one component of the database query;
  a partition allocation manager having an input coupled to the query receiver output for receiving the specification of the data source, and for receiving a number of the graphics processing units in the plurality, the partition allocation manager for computing an allocation of a plurality of portions of the data source across each of the plurality of graphics processing units, and for providing at an output the allocation;
  a query manager at each of the graphics processing units, having an input coupled to the partition allocation manager output for receiving at least a portion of the allocation, to the query receiver output for receiving the at least one component of the database query, and coupled for receiving a subset of the plurality of portions of the data source allocated in the allocation to said graphics processing unit, the query manager for applying each of the at least one component of the database query to the subset of the plurality of portions of the data source to produce and provide at an output at least one set of results;
  a join manager having an input coupled to the query receiver output for receiving at least one of the at least one component of the database query and to the query manager output of at least two of the plurality of graphics processing units for receiving the at least one set of results from each such query manager, the join manager for consolidating at least one of the at least one set of results of each of the at least two of the plurality of graphics processing units to produce a consolidated set of results, and for providing at an output the consolidated set of results.

10. The system of claim 9:
  additionally comprising a column identification manager coupled to the query receiver output for receiving the at least one component of the database query, the column identification manager for identifying and providing at an output identifiers of columns of the data source used for filtering, joining or aggregating, responsive to the at least one component of the database query received at the column identification manager input;
  and wherein the partition allocation manager input is additionally coupled to the column identification manager output for receiving the identifiers of columns of the data source used for filtering, joining or aggregating, and the partition allocation manager computes the allocation of the plurality of the portions of the data source responsive to the identifiers of the columns of the data source used for filtering, joining or aggregating.

11. The system of claim 9:
  wherein the join manager additionally provides at the join manager output metadata identifying a criteria used to obtain the consolidated set of results; and
  additionally comprising a cached result set manager having an input coupled to the join manager output for receiving the consolidated set of results, the metadata identifying the criteria used to obtain the consolidated set of results, and an additional request comprising an additional query and an additional specification of the data source, the cached result set manager for comparing the additional query and the additional specification of the data source to the metadata to determine whether the consolidated set of results can be reused to process the additional request, and for providing at an output an indication of the consolidated set of results, responsive to a determination that the consolidated set of results can be used to process the additional request.

12. The system of claim 11, additionally comprising a partition identifier having an input coupled to the cached result set manager output for receiving the indication of the consolidated set of results, the partition identifier for partitioning via an input/output the consolidated set of results responsive to the indication received at the partition identifier input.

13. The system of claim 9: wherein:
  additionally comprising a topology identification manager for identifying via an input/output and providing at an output a number of one or more central processing units in the computer system and identifiers of graphics processing units electrically coupled to each of the one or more central processing units; and
  wherein the partition allocation manager input is additionally for receiving the number of one or more central processing units in the computer system and identifiers of graphics processing units electrically coupled to each of the one or more central processing units, and the partition allocation manager is additionally for allocating via the partition allocation manager output each of the plurality of portions of the data source to a central processing unit electrically coupled to the one or more graphics processing units in the plurality to which said portion of the data source in the plurality was, or will be, assigned.

14. The system of claim 9 wherein each of the plurality of portions of the data source comprises a partition of the data source used for long term storage of the data source.

15. The system of claim 9 wherein each of the plurality of portions of the data source comprises a plurality of rows of the data source that generate a same hash result.

16. The system of claim 9:
  wherein:
    the query receiver input is additionally for receiving a partition specification that specifies a manner in which the data source should be partitioned; and
    the query receiver is additionally for providing the partition specification at the query receiver output;
  additionally comprising a partition manager having an input coupled to the query receiver output for receiving the partition specification and the specification of the data source, the partition manager for apportioning the plurality of portions of the data source responsive to the partition specification via an input/output; and
  wherein each query manager input is coupled to the partition manager input/output for receiving the subset of the plurality of the portions of the data source allocated in the allocation.

17. A computer program product comprising a non-transitory computer useable medium having computer readable program code embodied therein for performing a database query on a computer system comprising a plurality of graphics processing units, the computer program product comprising computer readable program code devices configured to cause a computer system to:

receive a request comprising the database query and an express or implied specification of a data source;

parse the request to identify at least one component of the database query;

compute an allocation of a plurality of portions of the data source across each of the plurality of graphics processing units;

at each of the plurality of graphics processing units, apply each of the at least one component of the database query parsed to the portion of the data source allocated to the respective graphics processing unit to produce at least one set of results;

consolidate at least one of the at least one set of results of each of the plurality of graphics processing units by at least one central processing unit or graphics processing unit of the computer system comprising the plurality of graphics processing units to produce a consolidated set of results; and output the consolidated set of results.

18. The computer program product of claim 17:

additionally comprising computer readable program code devices configured to cause the computer system to identify columns of the data source;

and wherein the allocation of the plurality of the portions of the data source is computed responsive to the columns identified.

19. The computer program product of claim 17, additionally comprising computer readable program code devices configured to cause the computer system to:

store the consolidated set of results, and metadata identifying a criteria used to obtain the consolidated set of results;

receive an additional request comprising an additional query and an additional specification of the data source; and compare the additional query and the additional specification of the data source to the metadata to determine whether the consolidated set of results can be reused for the additional request.

20. The computer program product of claim 19, additionally comprising computer readable program code devices configured to cause the computer system to partition the consolidated set of results responsive to the determining.

21. The computer program product of claim 17, additionally comprising:

computer readable program code devices configured to cause the computer system to identify a number of one or more central processing units in the computer system and the graphics processing units electrically coupled to each of the one or more central processing units; and computer readable program code devices configured to cause the computer system to allocate each of the plurality of portions of the data source to a central processing unit electrically coupled to the graphics processing unit in the plurality to which said portion of the data source in the plurality was, or will be, assigned.

22. The computer program product of claim 17 wherein each of the plurality of portions of the data source comprises a partition of the data source used for long term storage of the data source.

23. The computer program product of claim 17 wherein each of the plurality of portions of the data source comprises a plurality of rows of the data source that generate a same hash result.

24. The computer program product of claim 17 wherein each of the plurality of portions of the data source are apportioned from the data source as specified in the request.

* * * * *